United States Patent [19]

Lindberg

[11] 4,270,508
[45] Jun. 2, 1981

[54] COMBUSTION CONTROL SYSTEM
[75] Inventor: John E. Lindberg, Berkeley, Calif.
[73] Assignee: U.S.A. 161 Developments Ltd., Berkeley, Calif.
[21] Appl. No.: 84,412
[22] Filed: Oct. 12, 1979
[51] Int. Cl.³ .................. F02B 47/08; F02M 25/06
[52] U.S. Cl. .................................. 123/568; 123/572; 123/573
[58] Field of Search ............... 123/568, 570, 572, 573

[56] References Cited

U.S. PATENT DOCUMENTS

| | | | |
|---|---|---|---|
| 4,112,892 | 9/1978 | Lindberg | 123/568 |
| 4,183,338 | 1/1980 | Lindberg | 123/573 X |

Primary Examiner—Wendell E. Burns
Attorney, Agent, or Firm—Owen, Wickersham & Erickson

[57] ABSTRACT

This combustion control system adds a fluid and heat energy to the air-fuel mixture of the induction system of an internal combustion engine in response to engine need to improve combustion, to increase power, to improve efficiency, and to reduce emissions. Fluidic control mechanisms provide the control functions without any moving parts. A vortex chamber serves as a main variable impedance control mechanism. The outlet of the vortex chamber is connected to the positive crankcase ventilation (PCV) inlet to intake manifold downstream of the butterfly valve. The vortex chamber has a tangential input for PCV gases and an axial input for supplying air, aqueous fluid, and exhaust gases, all for mixing within the vortex chamber and transmitted to the intake manifold. The exhaust gases are conducted to the vortex via two parallel ejectors, one of which sends water or vapor across a gap to mix with intake air that is sucked into the exhaust gases by the other ejector.

20 Claims, 3 Drawing Figures

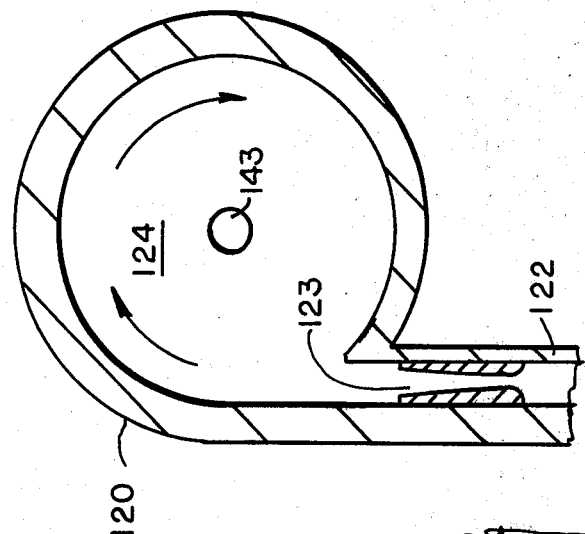
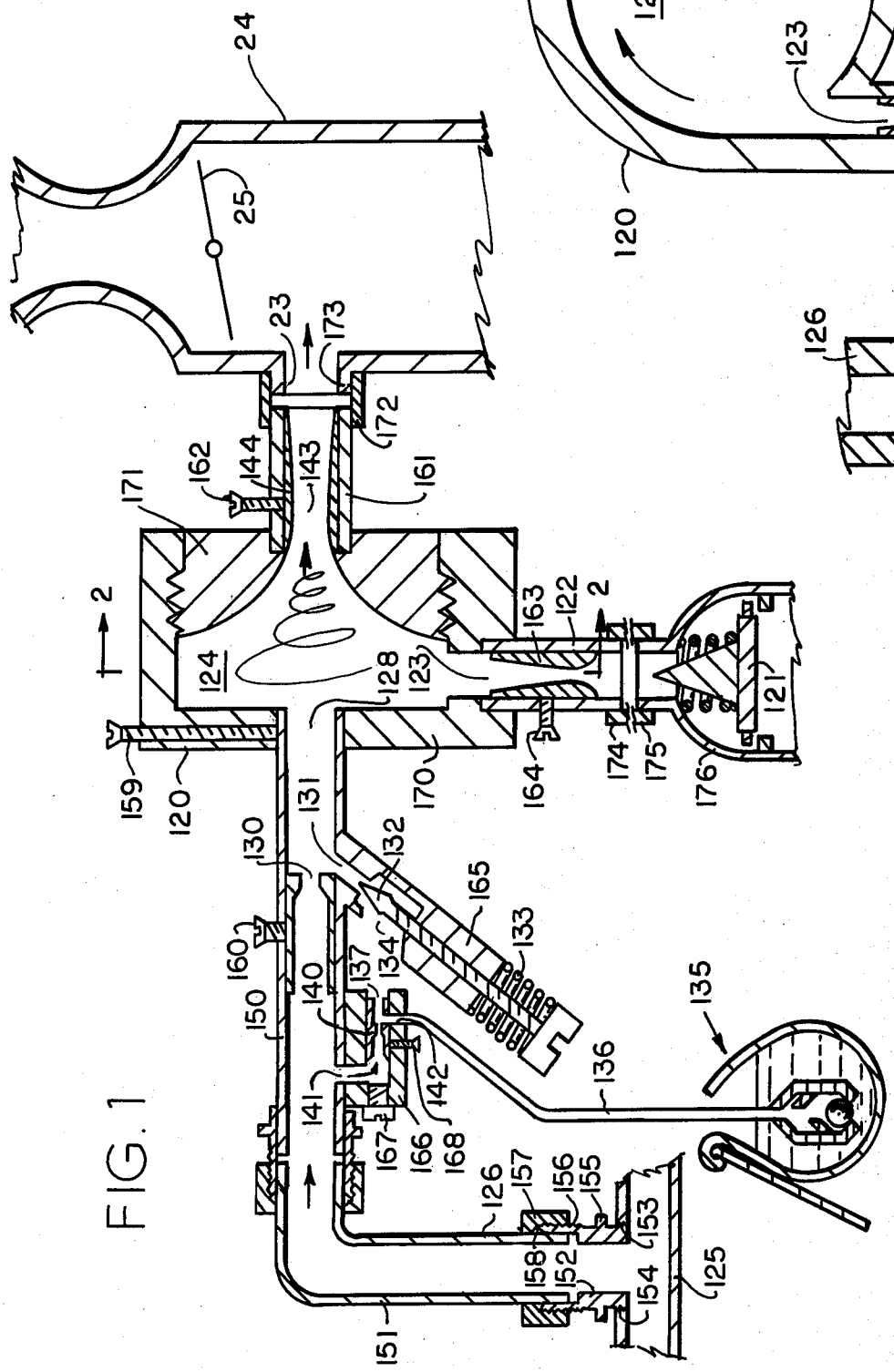

COMBUSTION CONTROL SYSTEM

BACKGROUND OF THE INVENTION

The present invention is an improvement over the invention in my co-pending patent application, Ser. No. 793,555, filed May 4, 1977, now U.S. Pat. No. 4,183,338, issued Jan. 15, 1980.

Fluids, such as water or water vapor, have heretofore been added to the induction system of an internal combustion system. However, the prior art did not obtain the full benefits which can be obtained by proper regulation of the amount and condition of added fluid, along with a proper amount of associated heat energy, turbulence, and with PCV gases and air, at all conditions of engine operation.

The engine needs different amounts of fluid at varying conditions of operation of the engine. The engine's need for fluid at any particular condition of operation is dependent on the amount and condition of fluid which will produce the best engine operation at that condition. The best engine operation includes obtaining complete lean, clean combustion with the lowest emissions of HC, CO and $NO_x$ and best fuel economy without detonation, pre-ignition, or after-fire (dieseling) plus highest power at full-throttle. The engine's need for fluid varies widely from no fluid at all under certain conditions of operation to amounts of fluid flow in the same order of magnitude of fuel flow at other conditions of engine operation. For example, the engine's need for fluid is zero at engine shut-off as no liquid can be permitted to flow into the engine when the engine is shut off. If the liquid flow into the engine were to be permitted at shut-off, corrosion and or liquid lock could occur.

At normal, steady-state, low-speed idle, only a trace amount of fluid, or no fluid at all, is required to give optimum low idle emissions.

Increasing quantities of fluid proportionate to power are required as engine power is increased at each steady-state point.

Under dynamic conditions, such as, for example, acceleration at high BMEP, an extra amount of fluid is required over and above operation at a steady-state condition; and, in the case where the fluid is steam, the steam should be of a lower quality, that is, with a certain percentage of water droplets carried with the steam (in order to give maximum combustion cooling) to keep nitrous oxide emissions within satisfactory limits.

On deceleration, less fluid is required at each point in the deceleration than would be desired for operation at a steady-state at any point (zero fluid at zero throttle deceleration).

The engine's need for fluid is also determined by limiting the fluid to an amount that will not hurt the combustion. For instance, in deceleration, if fluid is not limited, too much fluid can be introduced and cause the combustion to be poor. This will produce incomplete combustion and will cool the flame sufficiently that undesirable amounts of HC and CO will be produced. Engine efficiency can be seriously impaired. Hydrocarbon deposits also increase.

On acceleration, the engine's need for fluid is dependent on introducing the right amount of fluid to absorb excess heat, by its high specific heat plus latent heat of evaporization of liquid droplets included (water droplets in the case of steam) plus heat of dissociation; excess engine heat generation would otherwise go toward producing high combustion and surface peak temperatures and peak pressures at about top dead center. However, the heat absorption still must be done without introducing too much fluid so as to impair combustion with the undesirable effects noted above. By introducing the right amount of additional fluid, the energy is absorbed as energy in steam (in the case where the fluid is water) which is given back during the latter part of the cycle as expansion of the steam. This adds smoothly at favorable crank angle to the power stroke and torque of the engine. The right amount of additional fluid at this point, therefore, prevents hot spots and smooths the pressure and temperature and energy conversion.

Also, the right amount of fluid needs to be introduced to provide for engine cleanliness. The right amount of fluid will provide both clean combustion and removal of engine deposits.

Further, it is needed to inject the right amount of fluid and heat in order to heat and thereby to vaporize the fuel to give equal fuel-air ratio distribution and mass distribution among the cylinders. This gives maximum economy and lowest emissions.

Extra charge density can be provided by introducing fluid droplets in the fuel-air mixture charge at full throttle or high power operation. The fluid droplets, if introduced into the cylinder at the proper time before valve closure, cool the charge so as to increase the charge density before the valve closure, and thus, in effect, provide a form of supercharging.

Other inventors have not recognized these problems and have not implemented any control mechanism effective to produce the benefits which can be obtained by controlling the amount of added fluid and heat energy in response to engine need at each condition of operation of the engine.

Prior attempts to introduce fluids into the engine have relied primarily on intake manifold vacuum as the driving force to induce liquid flow. This has the disadvantage of having the greatest vacuum (and hence the larger driving force for liquid flow) at the conditions when the engine needs the least or no addition of liquid (throttle closed). In addition, when the engine requires the greatest liquid flow (acceleration or heavy load) manifold vacuum is at a minimum. The present invention uses venturis, ejectors, and vortices, and other fluidic controls in such combination to provide fluid flow when needed by the engine and not necessarily just when most easily injected by intake manifold vacuum.

It is a primary object of the present invention to control the added amount of fluid and heat energy, turbulence, PCV gases, and air, in relation to engine need at all conditions of operation of the engine to obtain the benefits as described above.

SUMMARY OF THE INVENTION

The present invention provides a fluidic computer which provides the basic function of controlling the amount of fluid added, with the proper amount of heat from the exhaust gases, turbulence, PCV gases, and air in response to the engine's need for the added fluid at each condition of operation of the engine.

The fluidic computer of the present invention accomplishes this control function with no moving parts. It uses, as one input, the exhaust gas from the manifold near one cylinder. It also uses the additional inputs of PCV gases from the PCV valve outlet (preferably with the valve removed), fluid (in a particular embodiment, water) from a reservoir provided in the system, and atmospheric air.

In a preferred embodiment, the mixed liquid, exhaust gases, PCV gases, and air are admitted to the induction system of the engine at the PCV inlet below the butterfly valve.

The fluidic computer of the present invention utilizes the changing vacuum condition at the PCV inlet in combination with the changing exhaust gas pressure and temperature, to control the quantity and quality of the liquid and also to control (in proper relationship to the liquid) the amounts and proportions of each of the gases: exhaust, PCV, and air added. It achieves this control by means of a number of control variables provided by the fluidic computer system itself, and supplies the proper amounts of each of these inputs for each condition of engine operation.

A fundamental feature of the control system of the present invention is a variable impedance flow control mechanism. The control mechanism produces an impedance to flow through the mechanism which varies in a non-linear relationship to the pressure differential across the control mechanism.

In a preferred embodiment of the present invention this flow control mechanism is a main or primary vortex chamber having an outlet connected to the PCV inlet and having inputs connected to two additional variable impedance flow control mechanisms.

In this particular embodiment, two parallel ejectors in a pipe connecting the exhaust gases to a central axial opening of the vortex chamber are used to draw in the needed amounts of air and aqueous fluid and send them into the vortex chamber, without a coupling between the aqueous fluid ejector outlet and the intake manifold vacuum. PCV gases are sent by a nozzle to a tangential inlet into the vortex chamber.

BRIEF DESCRIPTION OF THE DRAWINGS

In the drawings:

FIG. 1 is a view in elevation and in section of a combustion control system embodying the principles of the invention.

FIG. 2 is a view in section taken along the line 2—2 in FIG. 1.

FIG. 3 is a detail view of a scoop for taking low-pressure gas from the exhaust manifold.

DESCRIPTION OF A PREFERRED EMBODIMENT

FIG. 1 shows a vortex unit 120 connected to an intake manifold 24 below a butterfly valve 25 and preferably using a standard PCV valve entrance 23 therewith. The connection between the vortex unit 120 and the intake manifold 24 may be substantially the same as in FIG. 1 of my U.S. Pat. No. 4,183,338 (presently Ser. No. 793,555, filed May 4, 1977) or if desired the grooves 84 shown there may be omitted. In the present form of the invention, the PCV gases may flow past a PCV valve 121, through a conduit 122, and via a small orifice or nozzle 123 tangentially enter a vortex chamber 124 in the vortex unit 120, shown also in FIG. 2. Actually, the PCV valve 121 exercises little, if any, control and may be removed and discarded, the main control being at the vortex 124 itself. In most instances the PCV valve, if left in place, will not even move, and the total control is exercised at the vortex 124.

Gas under pressure is picked up from an exhaust manifold 125 and conducted through a conduit 126. If desired, as shown in FIG. 3, there may be a scoop 127 to aid in getting the gases from the exhaust manifold 125 to flow into the tube 126. The scoop 127 is not required unless there is a low back pressure due to exhaust system tuning or the absence of a muffler. In distinction to the device of Ser. No. 793,555, the vortex unit 120 is placed as close as possible to the intake manifold 24 and need not be as close to the exhaust manifold 125. The conduit 126 may be a stainless steel tube and may be provided with suitable insulation to retain heat. Preferably, the conduit 126 is relatively small in diameter to avoid heat losses also. For example, on larger automotive engines, thin-wall tubing with an outer diameter of about ¼ inch and with a wall thickness of about 0.020 inch may be used; for smaller engines the conduit 126 may have an outer diameter of about 3/16 inch.

The conduit 126 leads into the axial center line of the vortex unit 120 at an inlet 128. In the conduit 126 ahead of the inlet 128, is a first ejector 130 which is used to pull air into the conduit 126 through an inlet port 131. Carbon deposits are avoided by omitting any diffuser section and simply following the ejector with the full inner diameter of the conduit 126. By spacing the ejector 130 well ahead of the inlet 128—by at least twice the diameter of the ejector nozzle, good ejector pumping is obtained. The amount of air which can be drawn into the conduit 126 is controlled by a needle valve 132. A spring 133 may be used to keep the needle valve 132 from turning accidentally, due to vibration. The needle valve 132 controls an air intake orifice 134 by axial threaded adjustment.

A reservoir 135 for water or the like, is provided with a conduit 136 which leads up to a constant diameter (e.g., drilled) outlet 137 just beyond a second ejector 140 in parallel with the ejector 130. Exhaust gas from the conduit 126 passes by a passage 141 to the ejector 140, and an outlet 142 ejects the moisture ladden air to atmosphere. This outlet 142 is about ⅛ inch from the exit of the outlet 137, an the outlet 137 is in line and spaced only about ¼ inch from the air intake 134 for the needle valve 132, so that when the stream pressure builds up through the ejector 140 it carries moisture into the inlet 134 and therefore via the valve 132 and the port 131 into the vortex 124.

An important feature of this invention is that it prevents any coupling of the intake manifold pressure to the water outlet 137, which, if it took place, would by itself draw water into the vortex 134 in excessive amounts. By having the outlet 137 separated from the inlet 134, with atmospheric pressure air space in between, such coupling is positively prevented, and instead there is a decoupling. The function is, of course, to prevent excess amounts of moisture from being drawn in due to a coupling effect. It is important that there be no coupling at all under engine idle conditions and deceleration conditions, when no additional moisture is desired, and this, of course, is the time when the vacuum in the intake manifold is highest and most likely to cause coupling were the structure different and were the water connected directly into the inlet 128.

The operation of the device of FIGS. 1 and 2 is as follows: The PCV products come in through the orifice 123 tangentially into the vortex 124. As shown in FIG. 2, these gases may rotate clockwise, and this would be the ideal arrangement for southern hemisphere operations and the equivalent; the opposite (counter-clockwise) rotation would be used in the northern hemisphere. Thus, the PCV gases are initially separated from and are therefore not greatly heated by the exhaust gases. Meanwhile, the exhaust gases are being cooled by air and the water. The rotating PCV products put also into rotation the exhaust gas, the air and the water which enter into the center of the vortex 124. These together in rotation create a choking action at the exit 143 of the vortex 120, and this results in a high impedance to fluid flow-through past the exit 143 through a venturi-like member 144 into the intake manifold 24. To prevent deposit of solids, the venturi 144 should diverge on its outlet side by no more than about 12° and preferably less than 6°, and the vortex 124 should have its tapered or curved wall, preferably shaped like a cusp curve, curved quite smoothly into the venturi inlet. The venturi-like orifice 143 has a minimum cross-sectional area designed to accelerate the gas flow to a sonic velocity at its narrowed point. The optimum cross-sectional area is a linear function of the cubic displacement of the engine. Nevertheless, a very high degree of rotational energy does enter below the butterfly valve 25 and creates a high degree of turbulence as it intermixes with the fuel and the air of the carburator. This turbulence is a great deal of help in providing much more uniform mixing of the fuel-air mixture, and in the case, also of the added exhaust heat, moisture when provided, air, and the PCV products. It also is the means by which the flow of PCV products is itself properly monitored, as it provides a high impedance to flow at decleration and idle so that only a small amount of PCV products then flow. As the butterfly valve 25 is opened and the vaccuum in the intake manifold 24 decreases such that at full-throttle it is only ½ inch, mercury, approximately.

This, then, reduces the amount of difference in pressure between the intake manifold 24 and the atmospheric pressure at the PCV tube entrance, (i.e., essentially atmospheric pressure) at the PCV valve 121.

At full throttle, because of the low pressure differential across the vortex 124, (the PCV tangent entrance 123 is at one atmosphere and the intake manifold 24 is only ½ inch Hg below atmosphere at full-throttle), there is almost no force to create tangential flow. Consequently, vortex rotational flow essentially stops at full-throttle, and the impedance to flow through the vortex 124 including the vortex choke point 143 is substantially zero. Therefore, flow is maximum.

As the throttle 25 is gradually closed, the intake manifold vacuum gradually increases, thus increasing the pressure differential across the vortex 124. The higher the vacuum the higher the tangent PCV mass flow momentum with its resultant increased impedance to fluid flow at the orifice 143. Conservation of momentum causes the mass in rotation to accelerate to higher and higher rotational speeds as the radius of rotation decreases. The axial flow becomes very small as the rotational speed increases. With this the axial flow of all fluids becomes very low.

Because of the high presssure differential at the exit 143, there is no appreciable pressure differential across the PCV valve 121, and that valve stays full open. In fact, in the ideal situation, the PCV valve is removed, and a plastic shell having the same shape may be substituted at this point. The PCV products are controlled, therefore, by the vortex generator 120 and the impedance created at the exit 143. This same varying impedance at the exit 143 for the same reason, controls the total mass flow that comes in with exhaust heat, past the ejector 130 and the amount of water and air that are allowed to come in, because the major impedance to the whole system is controlled at the exit 143. The ratios of the amount of exhaust gas and air and the PCV products are controlled by the ratio of the orifices controlling each one.

The needle valve 132 is also useful in providing an adjustment for idle air control in cars where the former adjustability of the idle mixture control valve has been taken away.

One of the key features shown in FIG. 1 is that of reducing the amount of energy used in the control system. For Ser. No. 793,555, now U.S. Pat. No. 4,183,338 issued Jan. 15, 1980 I used rotational energy for each of the major controls, which consumes much more energy than is common when the ejector 130 is used and when orifices accomplish the same flow control and preserve the maximum amount of energy, which is in a form of pressure differential so that it can appear across the vortex 120 to create the maximum amount of turbulence as it leaves the vortex generator; thus, the maximum amount of turbulence enters below the butterfly valve and causes the maximum amount of mixing of the fuel-air products before the mixture reaches the combustion chamber.

FIG. 1 also shows a significant embodiment enabling rapid installation and also rapid part changes and adjustments. Thus, the exhaust gas conduit 126 may, as shown, be made in three sections 150, 151, and 152, the sections 150 and 152 being straight and the section 151 as below. The section or fitting 152 has a threaded end 153 that fits into a threaded opening 154 in the exhaust manifold 125, and a hexagonal flange 155 near its center. The section 152 may have a threaded end 156 joined to the section 151 by a standard swage type fitting 156 with a seal 158. An identical fitting 157 may be used to join the sections 151 and 150. Insulation is not illustrated but is preferably provided around the full length of the conduit 126, and also around the vortex member 120 and other parts that are to be kept hot. The section 150 may be secured to the vortex member 120 by a slip fit and held in place by a set screw 159, or the members 120 and 150 may be made as a single piece or brazed together.

The first ejector 130 may be slipped inside the tube section 150 and held in place by a set screw 160, enabling some adjustment longitudinally, or may be made as a single piece, if desired. Similarily, the venturi tube 144 may be held in a connecting tube 161 (which connects the vortex member 120 to the intake manifold 24) by a set screw 162. With this structure, the venturi tube 144 is easily replaced (as for a change in sizes), as is the first ejector 130. This also applies to a venturi tube 163 which supplies the nozzle 123; it fits into the tube 122 and is held in place at a desired location by a set screw 164. Again, unitary construction may be provided, if desired.

The needle valve 132 may be in a housing 165 that may be made as a unitary part of the section 150, as by casting, or may be brazed thereto. Similarily, the second ejector 140 may be located in a member 166 that may be an integral portion of the section 150 or brazed thereto. If cast with the section 150, it may be split into two pieces to provide the passage 141 or may be drilled and plugged; if brazed, the passages are provided very simply, and there will be a plug 167 inserted at the dead end. A set screw 168 may hold the second ejector 140 in place.

The vortex member 120 may be made in two pieces 170 and 171, if desired, as shown. The tube 161 and the venturi tube 144 may be integral parts of the piece 171, if desired. Press fits may be used instead of threading, of course.

The various sizes of the parts vary, according to such things as the engine displacement. As an example, for a 225 cubic inch displacement, six-cylinder engine, here are some examples of a workable structure and the best I have made so far:

| ELEMENT | LENGTH | DIAMETER | ORIFICE |
|---|---|---|---|
| Ejector 130 | $\frac{1}{2}''$ | $\frac{1}{4}''$ | 0.080'' |
| Ejector 140* | $\frac{3}{8}''$ | $\frac{1}{8}''$ | 0.038'' |
| PCV Venturi 163 | $\frac{3}{4}''$ | $\frac{1}{4}''$ | 0.112'' |
| Outlet Venturi 144 | 1'' | $\frac{1}{4}''$ | 0.170'' |

*The orifice outlet 137 is 0.052 inch in diameter, to go into the 0.038 inch orifice, and the fluid outlet 142 is spaced $\frac{1}{8}$ inch from the exit of the outlet 137, which is about $\frac{1}{4}$ inch from the air inlet 134.

The control assembly, comprising the assembled vortex member 120 along with the section 150 (including the installed ejector 130, the side passage 141 and its installed ejector 140, and the needle valve assembly 132, 133, 165), the tube 122 (with its installed venturi tube 163), and the connection tube 161 (with its installed venturi tube 143) is readily installed in the engine. A flexible hose 172 is used to connect the tube 161 to a fitting 173 at the PCV inlet 23. Similarily, a flexible hose 174 of any suitable length may be used to connect the tube 122 to a tube portion 175 of the PCV valve housing 176. Then the sections 151 and 152 and the conduit 136 may be connected to the section 150.

To those skilled in the art to which this invention relates, many changes in construction and widely differing embodiments and applications of the invention will suggest themselves without departing from the spirit and scope of the invention. The disclosure and the descriptions herein are purely illustrative and are not intended to be in any sense limiting.

I claim:

1. A combustion control system for an engine having an intake manifold with a throttle, a PCV gas inlet opening into said intake manifold, and an exhaust, including in combination:
    a vortex device having a vortex chamber with a tangential inlet, a second inlet, and a axial outlet connected to said PCV gas inlet opening of said intake manifold, said tangential inlet of said vortex being connected to a supply of gas at substantially atmospheric pressure, and
    an exhaust gas conduit connecting the other said inlet of said vortex device to said engine exhaust.

2. The system of claim 1 in which said gas at atmospheric pressure is air.

3. The system of claim 1 in which said gas at atmospheric pressure is PCV gas.

4. The system of claim 1 having a liquid reservoir connected by a conduit to said exhaust gas conduit, and means actuated by said exhaust gas for drawing from said reservoir thereinto.

5. The system of either of claims 1 or 4 wherein said second inlet is an axial inlet into said vortex chamber.

6. The system of claim 4 having means for decoupling intake manifold vacuum from said means for drawing liquid.

7. The system of claim 1 having means for sending the total pressure in said engine exhaust into said exhaust gas conduit.

8. A combustion control system for an engine having an intake manifold with a throttle, a PCV gas inlet opening into said intake manifold, and an exhaust, including in combination:
    a vortex device having a vortex chamber with a tangential inlet, a second inlet, and an axial outlet connected to said PCV gas inlet opening of said intake manifold, one said inlet of said vortex device being connected to one fluid conduit,
    an exhaust gas conduit connecting the other said inlet of said vortex device to said engine exhaust, and
    ejector means in exhaust gas conduit for pumping an additional fluid into said exhaust gas conduit and sending it into said vortex chamber.

9. The system of claim 8 in which PCV gas is connected to the tangential inlet.

10. The system of claim 8 in which atmospheric air is said additional fluid.

11. The system of claim 8 having a liquid reservoir connected by a conduit to said ejector means, said liquid being said additional fluid.

12. The system of either of claims 8 or 11 wherein said second inlet is an axial inlet into said vortex chamber.

13. The system of claim 11 having means for decoupling the intake manifold vacuum from said ejector means.

14. The system of claim 8 having scoop means joining said engine exhaust to said exhaust gas conduit for sending into said exhaust gas conduit the total exhaust pressure resulting from both the static head and the velocity head.

15. The system of claim 8 wherein said ejector means comprises first ejector means for drawing in atmospheric air and second ejector means for drawing in liquid from a source of liquid and sending it into the atmospheric air drawn in by said first ejector means.

16. The system of claim 15 wherein said second ejector means sends exhaust gas and said liquid to an air intake from said second ejector means across an open space, thereby decoupling the intake of liquid from the pressure in the intake manifold.

17. A combustion control system for an engine having an intake manifold with a throttle, a PCV gas inlet opening into said intake manifold, an exhaust manifold, and a PCV gas conduit, including in combination:
    a vortex device having a vortex chamber with a tangential inlet connected to said PCV gas conduit, a central axial inlet, and an axial outlet connected to said PCV gas inlet opening of said intake manifold,
    an exhaust gas conduit connecting said exhaust manifold to said axial inlet and having first and second parallel ejectors, with an air inlet opening beyond said first ejector, through which air is pulled into said conduit by the action of the exhaust gas passing through said first ejector, a gas outlet beyond said second ejector, through which some of said exhaust gas is expelled, and a fluid inlet between said gas outlet and said second ejector,
    a fluid reservoir connected by a conduit to said fluid inlet, and
    an air intake opening connected to said air inlet opening regulating air intake into said exhaust gas conduit.

18. The system of claim 17 wherein said air intake opening is spaced from and yet close to and in alignment with said gas outlet, so that the gas therein and the fluid contained therein are fed to said air intake in a manner avoiding coupling of the fluid intake to said intake manifold pressure.

19. A combustion control system for an engine having an intake manifold with a butterfly valve, a PCV gas inlet opening into said intake manifold, and exhaust manifold, and a PCV gas conduit, including in combination:
- a vortex device having a vortex chamber with a tangential inlet and a central axial inlet, and a cusp-like curved wall leading to an axial outlet,
- a first venturi tube connecting said axial outlet to said PCV gas inlet opening of said intake manifold,
- a second venturi tube connecting said tangential inlet to said PCV gas conduit,
- an exhaust gas conduit connecting said exhaust manifold to said axial inlet and having therein first and second parallel ejectors, with an air inlet opening beyond said first ejector, through which air is pulled in by the action of the exhaust gas passing through said first ejector, a gas outlet beyond said second ejector, through which some of said exhaust gas is expelled, and a fluid inlet between said gas outlet and said second ejector,
- a fluid reservoir connected by a conduit to said fluid inlet, and
- a needle valve adjacent to said air inlet opening regulating air intake into said exhaust gas conduit at an air intake opening, said air intake opening being spaced from and yet close to and in alignment with said gas outlet, so that the gas therein and the fluid contained therein are fed to said air intake in a manner avoiding coupling of the fluid intake to said intake manifold.

20. A combustion control system for an engine having an intake manifold with a butterfly valve, a PCV gas inlet opening into said intake manifold below said butterfly valve, an exhaust manifold, and a PCV gas conduit, including in combination:
- a vortex device having a vortex chamber with a tangential inlet and a central axial inlet into an end wall, and a second tapered and curved end wall leading to an axial outlet,
- a first venturi tube connecting said axial outlet to said PCV gas inlet opening of said intake manifold,
- a second venturi tube connecting said tangential inlet to said PCV gas conduit.
- an exhaust gas conduit connecting said exhaust manifold to said axial inlet and having therein a first ejector and an air inlet opening between said first ejector and said axial inlet, through which air is pulled in by the action of the exhaust gas passing through said first ejector,
- an auxiliary conduit smaller in diameter than said exhaust gas conduit and opening from it ahead of said first ejector, said auxiliary conduit having a second ejector therein, a gas outlet beyond said second ejector, and a fluid inlet between said gas outlet and said second ejector,
- a fluid reservoir connected by a conduit to said fluid inlet, and
- a needle valve adjacent to said air inlet opening regulating air intake into said exhaust gas conduit at an air intake opening, said air intake opening being spaced from and yet close to and in alignment with said gas outlet, so that the gas therein and the fluid contained therein are fed to said air intake in a manner avoiding coupling of the fluid intake to said intake manifold.

* * * * *